United States Patent [19]

Brüning et al.

[11] Patent Number: 4,472,173
[45] Date of Patent: Sep. 18, 1984

[54] CERAMIC-COATED CORUNDUM ABRASIVE GRAIN

[75] Inventors: Klaus Brüning, Rheinbreitbach; Gerhard Rehfeld, Aachen, both of Fed. Rep. of Germany

[73] Assignee: Dynamit Nobel AG, Troisdorf, Fed. Rep. of Germany

[21] Appl. No.: 440,394

[22] Filed: Nov. 9, 1982

[30] Foreign Application Priority Data

Dec. 2, 1981 [DE] Fed. Rep. of Germany ....... 3147597

[51] Int. Cl.³ .............................................. C09K 3/14
[52] U.S. Cl. ...................................... 51/298; 51/308; 51/309
[58] Field of Search ........................... 51/295, 308, 309

[56] References Cited

U.S. PATENT DOCUMENTS

| | | | |
|---|---|---|---|
| 2,527,044 | 10/1950 | Walton et al. | 51/308 |
| 3,269,815 | 10/1963 | Koopman | 51/308 |
| 4,278,449 | 7/1981 | Helletsberger et al. | 51/295 |

*Primary Examiner*—John E. Kittle
*Assistant Examiner*—W. Thompson
*Attorney, Agent, or Firm*—Felfe & Lynch

[57] ABSTRACT

In corundum abrasive grain which is ceramically coated with ground frit, a binder and fine grain highly abrasive material for the purpose of improving adhesion of the abrasive grain in its processing to resin-bonded abrasives and their use in wet grinding. The fine grain material forms from 1 to 5 weight percent of the untreated corundum grain and ranges in size from 10 to 50 microns, which corresponds to from 1 to 10 percent of the average diameter of the initial grain.

8 Claims, No Drawings

CERAMIC-COATED CORUNDUM ABRASIVE GRAIN

BACKGROUND OF THE INVENTION

The invention relates to corundum abrasive grain having a ceramic coating of from 0.25 to 2 weight percent, based on the weight of the untreated grain, of a ground glass frit, a binder and a fine grain.

Abrasive grain provided with a relatively smooth, adherent ceramic coating formed by a fused-on glass frit and containing, in addition, finely divided metal-oxide particles which are embedded in the coating in such a way that a portion of their surface projects from the coating has been described in U.S. Pat. No. 2,527,044.

European patent application No. 0 014 236 describes a process for the upgrading of aluminum-oxide abrasive grain containing some titanium oxide by the application of a ceramic coating. The coating is fused on and the grain structure is simultaneously altered by transformation of the titanium oxide to the tetravalent oxidation stage during a heat treatment at from 1250° to 1350° C. It is further proposed to add to the coating material silicon carbide (SiC), which at the temperatures used decomposes completely, with formation of $CO_2$ or CO and $SiO_2$ or SiO.

In the prior art cited, and also in practice, the increased tenacity with which ceramic-coated abrasive grain is held by resin bonds is attributed to the increase in the specific surface of the abrasive grain and the resultant improved adhesion between the grain and the bond achieved by the use of fine-grained to ultrafine-grained fillers or finely dispersed bubbles when SiC is added.

SUMMARY OF THE INVENTION

The object of the present invention is to provide for still better adhesion between the abrasive grain and the bond in the production of resin-bonded abrasives than is secured in accordance with the prior art cited.

Especially in wet grinding by the use of resin-bonded grinding wheels or abrasive belts, where lubricating coolants must be used which tend to attack, i.e. soften the resin bond, there is a need for better bonding as well as longer service lives and higher grinding speeds of resin-bonded abrasives.

Criteria for the behavior of ceramic-coated resin-bonded abrasive grain in wet grinding are derived particularly from measurements of the bending strength of test specimens of resin-bonded abrasive grain stored in lubricating coolants. Such measurements permit evaluation of the loss in strength with time in wet grinding.

In accordance with the invention, said object is accomplished by using, in the case of corundum abrasive grain of the type mentioned, an addition of from 1 to 5 weight percent of a highly abrasive fine grain in the coating, in a size ranging from 10 to 50 microns, which corresponds to from 1 to 10 percent of the average diameter of the initial grain.

When used in resin-bonded wet-grinding abrasives, this will result in improved wet-grinding performance.

The corundum abrasive grain in accordance with the invention may be produced by conventional methods as follows:

The abrasive grain, for example, synthetic corundum, is wetted with a binder such as water glass (sodium silicate) in a mixer. A finely ground glass frit is then added. Lead-free glass frits are preferred for the coating of synthetic corundum. A fused material which has been ground after solidification and has the composition set forth below has proved satisfactory, in a frit particle size ranging from 0 to 100 microns, with respect to the strength properties obtained.

$SiO_2$: 27%,
$B_2O_3$: 23%,
$K_2O$: 19%,
$Na_2O$: 12%,
MgO: 8%,
$Al_2O_3$: 7%,
CaO: 4%,
BaO: 2%.

The highly abrasive corundum or silicon carbide fine grain added in accordance with the invention adheres to the surface of the wetted abrasive grain much like the glass frit. The highly abrasive grain added has a particle size ranging from 10 to 50 microns at the 50% point.

The abrasive grain so treated is charged through a metering means to an indirectly heated rotary kiln. At temperatures ranging from 800° to 1050° C., and preferably from 850° to 950° C., and retention times ranging from 6 to 20 minutes, the glass-frit particles soften and fuse to the surface of the abrasive grain and during the cooling which follows solidify to form a ceramic coating over the grain, the highly abrasive fine grain being bonded to the ceramic coating of the grains.

The thickness of the ceramic coating so obtained ranges from about 1 to 5 microns. When a thicker ceramic coating is used, it may flake off the abrasive grain.

The corundum abrasive grain ceramic-coated in accordance with the invention with the addition of highly abrasive fine grain has a substantially smooth and nearly pore-free ceramic-coated surface from which only a portion of the highly abrasive fine particles embedded in the ceramic coating projects. Micrographs of the surface of corundum abrasive grains in accordance with the invention show that it is smoother and closer-structured than the surface of commercially available ceramic-coated corundum abrasive grain whose coating contains an $Fe_2O_3$ addition as fine grain. A corundum abrasive-grain surface which is still smoother than that obtained by the addition of highly abrasive high-purity corundum will be obtained when silicon carbide is used as additive. The surface will then be interrupted by pores to the extent of not more than about 10 percent. However, the SiC fine grain added does not completely decompose in the abrasive grain coated in accordance with the invention. Moreover, the specific surface of the grain in accordance with the invention then is not larger than that of a corundum grain which has not been ceramic-coated. Consequently, the abrasive grain cannot be expected to be held by the resin bond with greater tenacity than it is in prior-art material having more pronounced surface roughness. The strength values of test specimens made of resin-bonded ceramic-coated abrasive grain in accordance with the prior art are not appreciably different from the strength values obtained with the material in accordance with the invention when the test specimens are stored dry. Surprisingly, however, the material in accordance with the invention has given substantially higher strength values after the test specimens were stored in lubricating coolants. On the basis of these results obtained with abrasive grain ceramic-coated in accordance with the invention, it can be assumed that the specific surface of the grain is not the only factor affecting the adhesion between the abrasive grain and the resin bond.

The material in accordance with the invention can be used to produce, by known processes, resin-bonded abrasives which are distinguished by longer service lives and higher operating speeds in wet grinding. Moreover, grinding wheels so produced have been found to have greater shattering strength.

DETAILED DESCRIPTION OF THE INVENTION

The invention will now be described in greater detail in terms of examples. The corundum abrasive grain, pretreated with a finely ground frit of the composition and particle size indicated, and with the addition of an aqueous 58 wt. % sodium silicate solution and highly abrasive fine grain, was mixed in a tumbling mixer, dried for 3 hours at 120° C., and then ceramic-coated in a rotary kiln at 950° C. and a retention time of 8 minutes. Parallelepipedal test specimens measuring 120×60×20 mm were then prepared from the ceramic-coated abrasive grains by the use of 2.5 wt. % liquid resin and 7.5 wt. % solid resin. The test specimens were cured at 180° C. The density of the test specimens was 2.34 g/cm³. Bending-strength test bars measuring 120×20×10 mm were then cut from the test specimens with a diamond saw.

The bending strength was determined with a conventional testing machine with a support spacing of 180 mm and a plunger advance of 3 mm/min. Consistent with the conditions encountered in practice, the test specimens were wet-stored at 35° C. in water to which 2 wt. % of a lubricating coolant had been added.

Presented in Table 1 are data on the materials used (grain size, sodium-silicate binder and glass-frit content, and fine-grain addition), the examples given for comparison relating to measurements made on corundum grains which had been ceramic-coated in accordance with the prior art as well as on material which had not been surface-treated.

Table 2 gives the measured bending strengths of the materials investigated as a function of wet-storage time. The materials used in examples 1, 21, 22 and 3 in accordance with the invention showed the best strength values for the periods of time involved.

TABLE 2

| | BENDING STRENGTH (N cm$^{-2}$) after wet storage for | | | | |
|---|---|---|---|---|---|
| EXAMPLE | 24 hr. | 168 hr. | 336 hr. | 504 hr. | 672 hr. |
| 1 | 2280 | 1780 | 1580 | | 1460 |
| 1A | 1230 | 910 | 900 | | 820 |
| 1B | 1510 | 1220 | 1160 | | 1100 |
| 21 | 2110 | 1900 | 1740 | | 1630 |
| 22 | 2220 | 2030 | 1860 | | 1750 |
| 2A | 1510 | 1530 | 1010 | | 870 |
| 2B | 1410 | 1360 | 1190 | | 1140 |
| 3 | 3170 | 2410 | 1960 | 1870 | 1730 |
| 3A | 2080 | 1280 | 960 | 800 | 780 |
| 3B | 2790 | 1690 | 1400 | 1360 | 1310 |
| 3C | 2600 | 1710 | 1400 | 1340 | 1280 |

It will be understood that the specification and examples are illustrative but not limitative of the present invention and that other embodiments within the spirit and scope of the invention will suggest themselves to those skilled in the art.

What is claimed is:

1. A corundum abrasive grain having a ceramic coating of from 0.25 to 2 weight percent based on the weight of the untreated grain, said coating comprising finely ground frit, a binder and from 1 to 5 weight percent of a highly abrasive fine grain material ranging in size from 10 to 50 microns, which corresponds to from 1 to 10 percent of the average diameter of the initial grain.

2. The corundum abrasive grain of claim 1, wherein the fine grain material in the coating is highly abrasive high-purity synthetic corundum.

3. The corundum abrasive grain of claim 1, wherein the fine grain material in the coating is highly abrasive silicon carbide.

4. The corundum abrasive of claim 1 wherein the binder is sodium silicate.

5. The corundum abrasive of claim 1 wherein the fine grain in the coating has a particle size of 10μ to 50μ.

6. The corundum abrasive of claim 1 wherein the frit has a particle size of up to about 100 microns.

7. A method for preparing a corundum abrasive grain comprising

TABLE 1

| Example | Material | Grain size | Sodium silicate wt. % | Frit wt. % | Fine grain wt. % |
|---|---|---|---|---|---|
| 1 | High purity synthetic corundum | 80 P | 1.4 | 0.4 | 1.8 Corundum, 10–20μ |
| 1A (Comparison) | High-purity synth. corundum | 80 P | — | — | — |
| 1B (Comparison) | High-purity synthetic corundum, ceramic-coated | Commercial grade A, 80 P | n.k. | n.k. | Fe$_2$O$_3$ |
| 21 | High-purity synth. corundum | 36 SN | 1.4 | 0.35 | 1.6; SiC, 10–30μ |
| 22 | High-purity synth. corundum | 36 SN | 1.4 | 0.35 | 1.8; high-purity synth. corundum, 10–30μ |
| 2A (Comparison) | High-purity synth. corundum | 36 SN | — | — | — |
| 2B (Comparison) | High-purity synthetic corundum, ceramic-coated | Commercial grade A, 36 SN | n.k. | n.k. | Fe$_2$O$_3$ |
| 3 | Medium-high-purity synthetic corundum | 24 SN | 1.6 | 0.5 | 2.6; medium-high-purity synth. corundum, 30–50μ |
| 3A (Comparison) | Medium-high-purity synthetic corundum | 24 SN | — | — | — |
| 3B (Comparison) | Medium-high-purity synth. corundum, ceramic-coated | Commercial grade A, 24 SN | n.k. | n.k. | Fe$_2$O$_3$ |
| 3C (Comparison) | Medium-high-purity synth. corundum, ceramic-coated | Commercial grade B, 24 SN | n.k. | n.k. | Fe$_2$O$_3$ | k.n. = not known mixing the corundum abrasive grain with finely ground frit, a solution of the binder, and the highly abrasive fine grain material, drying the mixture, and heating the dried mixture to a temperature above the fusing temperature of the frit and then cooling to form a ceramic coating.

8. The method of claim 7 wherein the mixture is dried at 120° C. and thereafter the dried mixture heated to about 950° C. for about 8 minutes to form the ceramic coating.

* * * * *